United States Patent [19]

Young et al.

[11] 3,976,798

[45] Aug. 24, 1976

[54] METHOD FOR PRODUCING BREADED VEGETABLE SHAPES

[75] Inventors: Larry L. Young, Roselle; Herbert Horn, Country Club Hills; Joseph G. Endres, Downers Grove, all of Ill.

[73] Assignee: Central Soya Company, Inc., Fort Wayne, Ind.

[22] Filed: Apr. 7, 1975

[21] Appl. No.: 565,674

Related U.S. Application Data

[63] Continuation of Ser. No. 402,119, Oct. 1, 1973, abandoned.

[52] U.S. Cl. ............................. 426/291; 426/292; 426/293; 426/296; 426/303; 426/615; 426/438; 426/524
[51] Int. Cl.² ................... A23B 7/16; A23L 1/212
[58] Field of Search ..................... 426/289–296, 426/438, 439, 524, 302–304, 615, 549, 441

[56] References Cited
UNITED STATES PATENTS

| | | | |
|---|---|---|---|
| 3,078,172 | 2/1963 | Libby | 426/293 |
| 3,656,969 | 4/1972 | Horn | 426/293 |

*Primary Examiner*—Norman Yudkoff
*Assistant Examiner*—Martin G. Mullen
*Attorney, Agent, or Firm*—Dawson, Tilton, Fallon & Lungmus

[57] ABSTRACT

A method for producing breaded vegetable shapes such as onion rings, wherein the coating of the breaded ring is set quickly, as by flash frying, before freezing and without cooking appreciably the vegetable ring; and where the ring is made directly from onion slices, the breading is provided in two layers; an interior layer of viscous batter with fine mesh breading, and an outer layer of relatively less viscous batter with relatively coarse mesh breading.

2 Claims, No Drawings

METHOD FOR PRODUCING BREADED VEGETABLE SHAPES

This application is a continuation of our copending application Ser. No. 402,119, filed Oct. 1, 1973, now abandoned.

BACKGROUND AND SUMMARY OF THE INVENTION

This invention relates to the production of breaded vegetable shapes. More particularly, it relates to breaded onion rings, although the invention has advantageous application to other shapes such as mushroom discs and other types of vegetable rings such as those of green pepper.

In the context of onion rings, a problem exists relative to the tendency of the batter coating on the rings to clot or clump when the rings start to thaw. It will be appreciated that such rings are marketed in packages where the quick frozen rings are in contact with each other. As thawing begins, the batter coating on adjacent rings may fuse or clot together so that, upon separation, the rings are exposed. Thereafter, when the user deep fries the ring, an unsightly, and perhaps unsavory, product results. It is therefore an important object of this invention to provide a method which avoids this drawback by providing a breaded coating which remains intact and integral throughout the thawing and frying by the ultimate user. This is achieved according to the invention by a rapid, short heating of the coated vegetable ring prior to the instant quick freeze.

In those instances where the vegetable ring is made directly from slices of onion, green pepper, etc., a further difficulty has been encountered in providing an adherent batter-breading coating, particularly one that resists detachment during the rapid, short heating step employed just prior to freezing. For example, when the normal batter-breading coating on a sliced onion ring (as compared to an onion ring produced by molding or extrusion from a slurry) is subjected to flash frying (for the rapid short heating), the normal batter-breading coating tends to explode and leave the surface of the vegetable ring. It will be appreciated that vegetable rings made from slicing vegetables have a relatively smooth and "sealed" surface which makes good adherence of the coating difficult. Thus, a product results which is imperfectly coated.

It is another important object of this invention to provide a method of coating and treatment which avoids difficulty. According to the invention, this is achieved by providing the coating in two layers. The initially applied or interior layer is of a relatively viscous batter, followed by application of a relatively fine mesh breading. Thereafter we provide the outer layer of less viscous batter and coarser mesh breading.

Other objects and advantages of the invention may be seen in the details set forth in the ensuing specification.

DETAILED DESCRIPTION

It is believed that the invention can best be understood through the recitation of a specific example of the best mode presently known for the practice of the invention.

EXAMPLE I

This example has to do with the provision of frozen, breaded onion rings prepared from onion slices — as compared with molded or extruded onion rings. Such sliced onion rings are deemed more desirable in the institutional field, viz., by restaurants, hotels, drive-ins, university cafeterias, etc. For this purpose, we select rings having a generally uniform size, i.e., in the range of about 3 to about 3½ inches in diameter. These are the subject of a U.S. Department of Agriculture Standard for large Grano-Granex variety of Bermuda onions, and are those most often used for ring processing. Such uniform size rings are considered most desirable by processors from the standpoint of yield and ease of processing. With larger rings there is a greater chance of breakage, while with the smaller rings there could be an economic detriment. Further, consumers are conditioned to rings of this medium size range. Still further, the rings normally are cut with a thickenss of about 5/16inch, i.e., generally in the range of about ¼ inch to about ½ inch; again a factor based upon trade economics and consumer conditioning. These shapes are then subjected to a series of processing steps which are set forth in separately captioned paragraphs below.

First Batter

We apply a first batter to the rings where the batter is relatively viscous. By this, we refer to a batter having a viscosity in the range of about 200 to about 600 centipoise as measured in a Brookfield RVT Viscosimeter having a No. 3 spindle and rotating at 50 r.p.m., the temperature of the batter being in the range of about 40°–50° F. We find it advantageous to maintain the batter at this reduced temperature so as to inhibit bacterial growth. In a continuous operation, the batter is recirculated and bacterial growth could accumulate, particularly if there is any baterial pickup from the onion rings themselves. In some instances, somewhat higher viscosities may be employed, the upper limit being essentially a function of pumpability and ability to cover the rings fairly readily. Lower viscosities normally result in inadequate coating. An example of a suitable batter is that available from the Newlywed Cracker Company, of Chicago, Illinois, under Code 255Batter Mix which contains starch, cornflour, wheat flour, baking powder, soy flour, salt, dried whey, vegetable stabilizer, and spices. With the batter mix just described, we add water in equal weight, which results in a viscosity of 375 ± 75 centipoise as measured at 40°–50°F. This batter mix is applied in a commercially available batter machine which has a traveling belt permitting partial submersion of the ring in combination with a waterfall. Exemplary of such machinery is that available from Korlow Corporation, of Posen, Ill.

First Breading

After the rings have been covered with batter, as in a continuous operation through traveling along on the belt in a batter-applying machine, we apply the first breading. In the specific example given, the breading again was obtained from the Newlywed Cracker Company, of Chicago, Illinois, as its commercial breading. The breading is sized so as to be relatively fine, i.e., powdery, as contrasted to the essentially granular breading which is to be employed hereinafter. By fine mesh, as applied to breading, we mean that the major constituent of the breading will pass through a 50 mesh sieve (U.S.S. Sieve Series), but will not pass through a 200 mesh sieve. In the instant example, the breading was designated 50 mesh and had the following particle size distribution:

| Percent retained | Sieve Size |
|---|---|
| trace (less than 1%) | on No. 30 |
| 35% | on No. 50 |
| 51% | on No. 100 |
| 11% | on No. 200 |
| 3% | through No. 200 |

Advantageously this is applied through a Korlow breading machine which is a continuous machine having a belt carrying about a ¼ inch buildup of breading, and which causes the rings to pass through a trickle fall of breading, after which the breading level is metered off as by a roller.

Second Batter

The second batter is applied by a machine essentially similar to that of the first batter, but differs from the first batter in having a lower viscosity. Advantageously, we provide a batter having a viscosity (as measured in a Brookfield Viscosimeter at 40°–50°F.) of about 20–100 centipoise. In the specific example, the viscosity was 50 centipoise obtained by suitable addition of water to the batter mix used in connection with the first batter described above. The upper level of viscosity is determined by the amount of breading takeup. With a quite viscous second batter coating, there is a substantial breading pickup, so as to lose the quality of the product, i.e., one is than marketing breading as contrasted to a breaded onion ring. On the other hand, the less viscous the coating, the poorer the tendency of the breading to stick, and this results in an inferior product.

Second Breading

This breading is also applied by a Korlow machine and has a much coarser particle size. By coarse mesh we mean that the major constituent, i.e., more than 50%, will be retained on a 30 mesh sieve (U.S.S.). Again, a breading marketed by The Newlywed Cracker Company, of Chicago, Illinois, was employed, and the particle size distribution is tabulated below:

| Percent Retained | Sieve Size |
|---|---|
| Trace | On No. 10 |
| 64% | On No. 30 |
| 21% | On No. 50 |
| 10% | On No. 100 |
| 6% | Through No. 100 |

Heating

To set the coating, i.e., coagulate the starch where starch is a principal ingredient, we heat the coating rapidly and for a relatively short period so as to avoid any substantial or appreciable cooking of the vegetable ring itself. In the illustration given, this was achieved through immersing the coated rings in a deep fat fryer wherein the temperature was maintained at an average of about 375° F. and for a period of about 10 seconds. We have determined that where deep fat frying oil is employed as the heating medium, such as Frymax, of Procter & Gamble, an immersion from about 5 to about 15 seconds at a temperature in the range of about 365° to about 385° F. is satisfactory. With the temperature of the oil bath above 400°, there is a tendency for the oil to break down and smoke. With conventional controls it is difficult to maintain the temperature at just below 400° F., and hence we adopt the temperature range set forth above as being a practical and feasible one. It will be appreciated, however, that the time and temperatures are interrelated and that these may be varied in different types of heating, such as infra-red or forced conduction. Again, equipment may be used which provides continuous operation as by having a mesh conveyor conduct the coated onion rings through the oil bath.

Freezing

After the flash frying, as indicated above, the coated onion rings are passed through a tunnel freezer, wherein the rings have a residence time of about 15 minutes, being subjected to minus 20°F. air and which brings the ring temperature to about zero.

Packaging

Following the quick freezing indicated above, the onion rings are packaged in polyethylene bags by a machine from Woodman Machine Company, of Decatur, Georgia, with approximately 2½ pounds per bag and eight bags per shipper case, which cases are stored about 0° F. until shipment.

In use, the products are normally reconstituted by about 1½ to 3 minutes submersion in a deep fat fryer. For this purpose, the conventional French fryer and fast food operations operates at about 350°F. This serves to cook the entire ring.

Example II

The procedure of Example I was followed starting with the application of the second batter. Here, however, molded onion rings were employed which were made from a slurry of onion material, according to the procedure set forth in copending application of Gerald J. Orlowski, entitled "Apparatus for Forming Edible Rings," Ser. No. 366,432, filed June 4, 1973. Equally satisfactory results were obtained.

Example III

In this example the procedure of Example I was followed with the exception that rings of green pepper were processed with equally satisfactory results.

Example IV

In this example the procedure of Example I was again followed, but utilizing as the vegetable material mushroom discs and with equally satisfactory results.

We claim:

1. In a process for producing breaded vegetable shapes, the steps of:
   applying to the vegetable shapes a first batter at a temperature of about 40°–50°F. having a viscosity of about 375 centipoise,
   applying a first breading to the batter coated shapes, a major proportion of said first breading passing through a 50 mesh sieve but being retained on a 100 mesh sieve,
   applying a second batter at a temperature of about 40°–50°F. to the breaded shapes, said second batter having a viscosity of about 50 centipoise,
   applying a second breading to the second batter coated shapes, a major proportion of said second breading being retained on a 30 mesh sieve,
   immersing the second breaded shapes for about 5–15 seconds in an oil bath having a temperature slightly under 400°F., and thereafter freezing the resultant product.
2. The method of claim 1 wherein the said vegetable shapes are selected from generally uniform, large sized onion rings.

* * * * *